(12) United States Patent
van Gemert et al.

(10) Patent No.: US 11,508,669 B2
(45) Date of Patent: Nov. 22, 2022

(54) METHOD AND APPARATUS FOR IMPROVED CIRCUIT STRUCTURE THERMAL RELIABILITY ON PRINTED CIRCUIT BOARD MATERIALS

(71) Applicant: NXP B.V., Eindhoven (NL)

(72) Inventors: Leo van Gemert, Nijmegen (NL); Jeroen Johannes Maria Zaal, Nijmegen (NL); Michiel van Soestbergen, Wageningen (NL); Romuald Olivier Nicolas Roucou, Arnhem (NL)

(73) Assignee: NXP B.V., Eindhoven (NL)

( * ) Notice: Subject to any disclaimer, the term of this patent is extended or adjusted under 35 U.S.C. 154(b) by 189 days.

(21) Appl. No.: 16/557,181

(22) Filed: Aug. 30, 2019

(65) Prior Publication Data

US 2021/0066209 A1   Mar. 4, 2021

(51) Int. Cl.
*H01L 23/00* (2006.01)
*H01L 23/498* (2006.01)
*H01L 23/66* (2006.01)
*G06F 30/394* (2020.01)
*G06F 30/398* (2020.01)
(Continued)

(52) U.S. Cl.
CPC .......... *H01L 23/562* (2013.01); *G06F 30/394* (2020.01); *G06F 30/398* (2020.01); *H01L 23/49838* (2013.01); *H01L 23/66* (2013.01); *H01L 24/16* (2013.01); *G06F 2113/18* (2020.01); *G06F 2119/08* (2020.01); *H01L 2223/6627* (2013.01); *H01L 2223/6677* (2013.01); *H01L 2224/16227* (2013.01); *H01L 2924/3511* (2013.01)

(58) Field of Classification Search
USPC ........................................................ 257/428
IPC .......... G06F 30/394,30/398, 2119/08, 2213/18; H01L 23/66, 24/16, 23/562, 23/49838, 2223/6627, 2224/16227, 2924/3511, 2223/6677
See application file for complete search history.

(56) References Cited

U.S. PATENT DOCUMENTS 4,847,136 A   7/1989   Lo
4,847,146 A   7/1989   Yeh et al.
(Continued)

FOREIGN PATENT DOCUMENTS

KR   20100123415 A   11/2010
TW      201729374 A    8/2017
WO   WO2008046188 A1   4/2008

*Primary Examiner* — Hrayr A Sayadian

(57) ABSTRACT

A structure is provided that reduces the stress generated in a semiconductor device package during cooling subsequent to solder reflow operations for coupling semiconductor devices to a printed circuit board (PCB). Stress reduction is provided by coupling solder lands to metal-layer structures using traces on the PCB that are oriented approximately perpendicular to lines from an expansion neutral point associated with the package. In many cases, especially where the distribution of solder lands of the semiconductor device package are uniform, the expansion neutral point is in the center of the semiconductor device package. PCB traces having such an orientation experience reduced stress due to thermal-induced expansion and contraction as compared to traces having an orientation along a line to the expansion neutral point.

17 Claims, 5 Drawing Sheets

(51) Int. Cl.
    *G06F 113/18*     (2020.01)
    *G06F 119/08*     (2020.01)

(56)             References Cited

U.S. PATENT DOCUMENTS 6,002,590  A  *  12/1999  Farnworth  ........... H05K 3/3436
                                                          361/749
    6,534,852  B1 *   3/2003  Lin  ..................... H01L 23/3128
                                                          257/690
    7,326,859  B2     2/2008  Tay et al.
    9,648,729  B1     5/2017  Wong et al.
 2013/0335939  A1 *  12/2013  Aleksov  .................. H01L 24/14
                                                          361/773
 2015/0131249  A1 *   5/2015  Marbella  .............. H05K 3/3452
                                                          361/767

* cited by examiner

METHOD AND APPARATUS FOR IMPROVED CIRCUIT STRUCTURE THERMAL RELIABILITY ON PRINTED CIRCUIT BOARD MATERIALS

BACKGROUND

Field

This disclosure relates generally to semiconductor device packaging, and more specifically, to improving thermal stress reliability of structures formed on PCB materials.

Related Art

Traditionally, a choice in circuit board materials for radio frequency (RF)/microwave applications has been between a "hard" or rigid circuit material and a "soft" or flexible type of circuit material. Hard circuit materials are typically based on a ceramic material, while the soft circuit materials are typically based on a polytetrafluoroethylene (PTFE) or Teflon material, along with a filler material. Some "soft" materials used for RF applications are flexible and rubber-like with a low elastic modulus (e.g., <100 MPa).

In order to affix semiconductor device to the various PCB materials, a soldering process is performed. Such soldering processes involve subjecting the conductive interface between the PCB material and the semiconductor device to significant heat (e.g., 250 C), and then cooling the structure down subsequent to the soldering process. This heating and cooling results in an expansion and contraction of the PCB material and the material (e.g., silicon) of the semiconductor device. If the PCB material and the semiconductor device material do not expand and contract at the same rate, the interface between them can be subject to significant stresses. In some cases, those stresses cause failure of metal traces on the PCB material, failure of the solder connection, and warpage of the PCB material. It is therefore desirable to provide a mechanism by which these stresses can be reduced, thereby reducing the possibility of such failures due to expansion and contraction.

BRIEF DESCRIPTION OF THE DRAWINGS

Embodiments of the present invention may be better understood by referencing the accompanying drawings.

DETAILED DESCRIPTION

Figure 1:
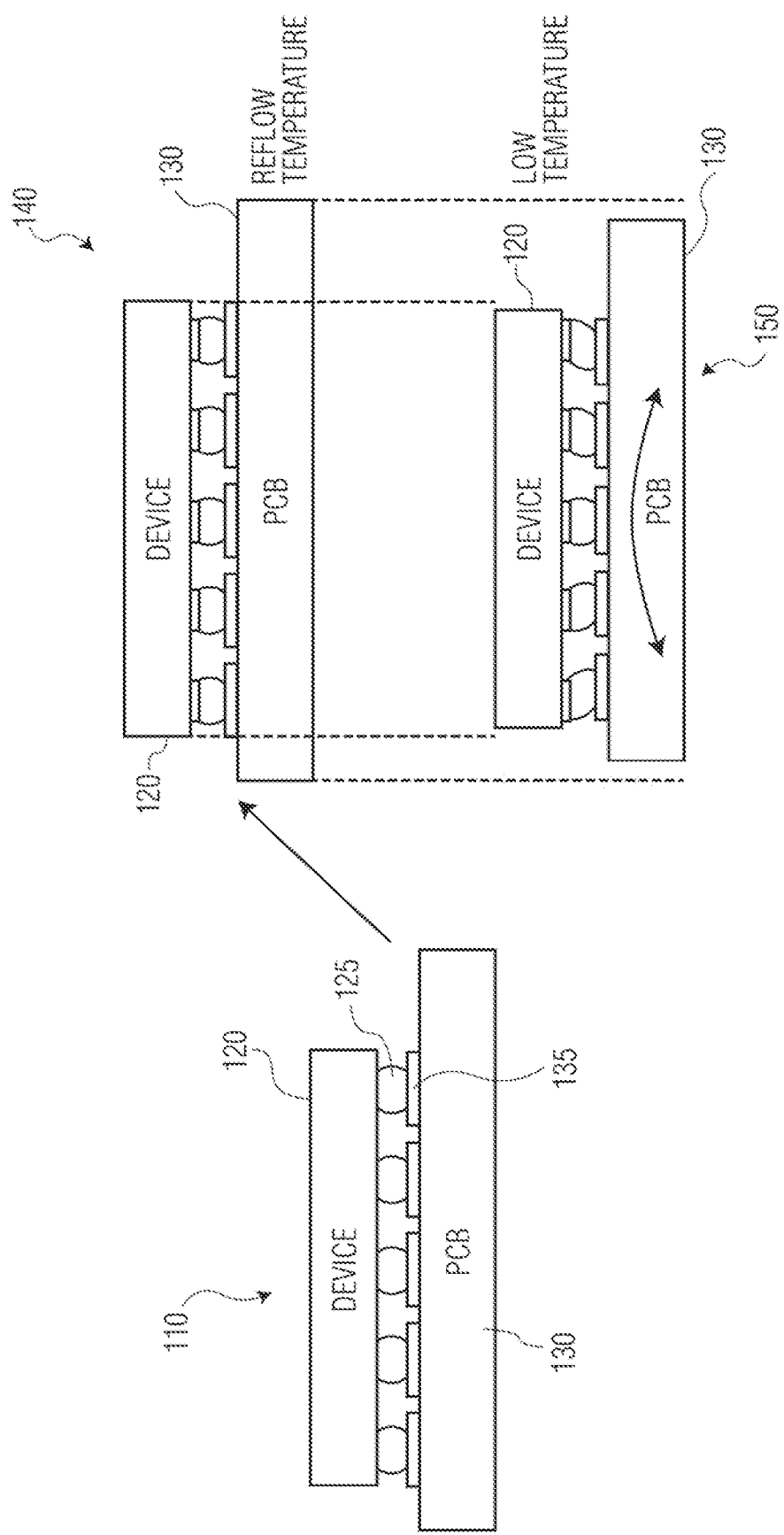
FIG. 1 is a simplified block diagram illustrating an example of expansion and contraction issues due to temperature changes in a semiconductor device package.

Embodiments of the present invention provide a structure that reduces the stress generated in a semiconductor device package during cooling subsequent to solder reflow operations for coupling semiconductor devices to a printed circuit board (PCB). Stress reduction is provided by coupling solder lands to metal-layer structures using traces on the PCB that are oriented approximately perpendicular to lines from an expansion neutral point associated with the package. In many cases, especially where the distribution of solder lands of the semiconductor device package are uniform, the expansion neutral point is in the center of the semiconductor device package. PCB traces having such an orientation experience reduced stress due to thermal-induced expansion and contraction as compared to traces having an orientation along a line to the expansion neutral point.

Printed circuit boards (PCBs) are used widely in the design and manufacture of electronic products incorporating semiconductor devices, sensors, antennas, and the like. The material used in a PCB is chosen for the environment and application of the device design because the materials can affect thermal behavior as well as electrical and mechanical characteristics of the final circuit. While the range of materials for PCBs has grown over time, with circuit materials optimized for specific types of designs (e.g., antennas) or frequency ranges (e.g., millimeter-wave), most materials can be classified as either a "hard" or rigid circuit material or a "soft" or flexible circuit material. Hard PCB materials are typically based on some form of a ceramic base, such as alumina, aluminum nitride, and beryllium oxide. Hard PCB materials can also serve as substrates for integrated circuits such as gallium arsenide, gallium nitride, silicon, and silicon carbide. Soft PCB materials are generally formed from a rubber-like material and are primarily used for RF applications. Such soft PCB materials can have an elastic modulus lower than 100 MPa, as compared to epoxy materials (5-20 GPa) and ceramics (>100 GPa).

Certain PCB materials are better suited for microwave and other high-frequency applications. For example, the popular glass-reinforced epoxy material called FR-4 is not well suited to certain applications due to a high dielectric loss at microwave frequencies. Such high losses can make FR-4 ill-suited for high-speed digital circuits or high-frequency analog applications above a few gigahertz. On the other hand, there are certain materials engineered for low dissipation factor at higher frequencies, such as flexible materials based on PTFE (e.g., RO3000 and RO4000 from Rogers Corp.). In addition, less-flexible ceramic circuit materials, such as alumina, are used in automotive millimeter-wave-frequency packaging and other infrastructure packaging due to being better suited for use with circuit transmission lines at microwave and millimeter-wave frequencies.

Flexible materials based on PTFE are often used because of ease of machining and low dielectric losses at microwave frequencies. Such materials also can be combined with other circuit materials and multilayer circuit configurations to achieve cost-effective use of the various materials for different functions. But the thermal characteristics of the various material options, such as coefficient of thermal expansion (CTE), can introduce concerns related to differences in expansion and contraction at the interfaces between different materials in a circuit.

During temperature cycling of PCB materials with related assembled package structures (e.g., package fan-out and wafer-level chip scale packaging), the PCB and package structures can expand and shrink at different rates due to the differences in CTE of the various materials. This can lead to fatigue of the solder joints between the semiconductor device and PCB. While new, stronger solder alloys can delay fatigue of the solder joint, one negative effect of this is that the next weakest link can be damaged due to expansion and contraction of the PCB. For example, metal traces on the PCB, large metal structures such as ground planes or antennas, or redistribution layers can be stressed due to CTE differences, resulting in breakage of the metal layer and failure of the product. This is especially true for softer PCB materials, such as those discussed above that are used for millimeter-wave applications.

FIG. 1 is a simplified block diagram illustrating an example of expansion and contraction issues due to temperature changes in a semiconductor device package. At stage 110, a semiconductor device 120 is placed on a PCB 130. Semiconductor device 120 includes a set of solder balls 125 that are placed in contact with a corresponding set of metal landing pads 135 on the surface of PCB 130. In order for the solder balls to form a permanent connection with the metal landing pads, at stage 140, the semiconductor device and PCB are raised to a temperature at which the solder flows. Typical solder reflow temperatures are in a range of 240 C to 260 C. At this temperature, semiconductor device 120 and PCB 130 expand and the solder balls are permanently affixed to the metal landing pads.

Subsequently, at stage 150, the combined structure cools off to lower processing temperatures or room temperature, and the PCB and semiconductor device materials contract according to their respective coefficients of thermal expansion. As illustrated, contraction of the materials of semiconductor device 120 (e.g., silicon) may not be as significant as the contraction of the materials of PCB 130. Thus, at lower temperatures, the PCB contraction can result in shear stress on the solder joint and potential warpage of the PCB and semiconductor device. The results of these stresses can be different for hard versus soft materials.

Figure 2:
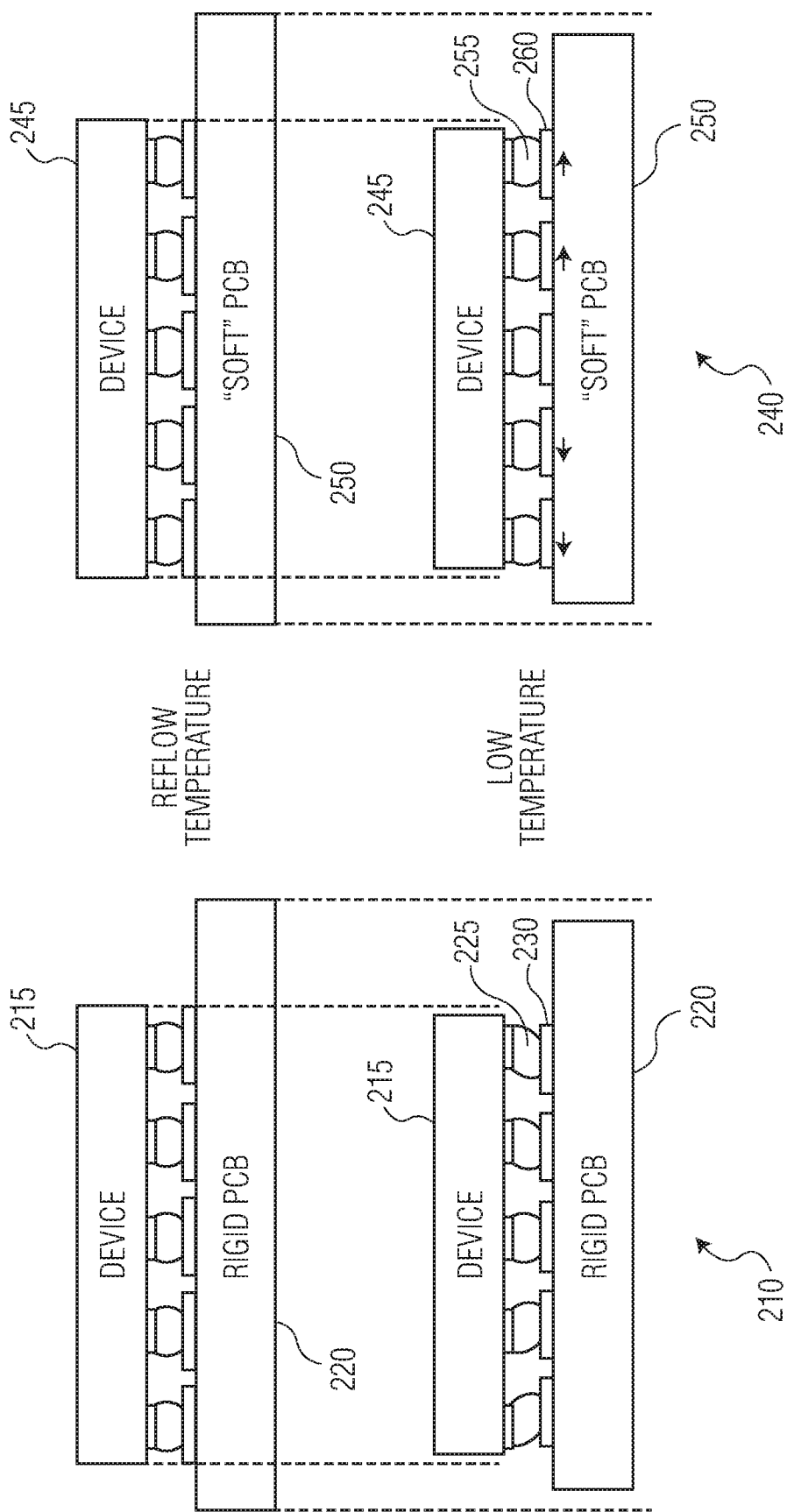
FIG. 2 is a simplified block diagram illustrating an example of differences in expansion and contraction issues due to temperature changes in semiconductor device packages incorporating either hard or soft PCB materials.

FIG. 2 is a simplified block diagram illustrating an example of differences in expansion and contraction issues due to temperature changes in semiconductor device packages incorporating either hard or soft PCB materials. Structure 210 illustrates the stresses present when a semiconductor device 215 is affixed to a rigid PCB 220. As structure 210 cools subsequent to solder reflow, semiconductor package 215 and rigid PCB 220 contract at different rates due to differing coefficients of thermal expansion (e.g., the rigid PCB contracting more than the semiconductor device). Solder lands 230 are fixed on the surface of rigid PCB 220, thereby causing stress on solder joints 225. The stresses increase the further out from the center of the area between semiconductor package 215 and rigid PCB 220, in light of the increased effects of contraction along a line associated with the solder joints.

Structure 240 illustrates stresses present when a semiconductor device 245 is affixed to a soft, or flexible, PCB 250. As structure 240 cools subsequent to solder reflow, again semiconductor package 245 and soft PCB 250 contract at different rates due to differing coefficients of thermal expansion. In structure 240, solder lands 260 can shift slightly due to the material of soft PCB 250. This can result in less stress on solder joints 255, but metal traces from the solder lands can receive stresses due to the movement of the solder lands, which can lead to broken traces and failure of the part. As illustrated in the figure, lowest stresses due to contraction of PCB 250 are experienced under the center of semiconductor package 245. This center location is an expansion neutral point for the illustrated configuration.

In order to avoid the stresses due to differing contractions of rigid and soft PCBs with respect to components affixed to those PCBs, embodiments of the present invention form metal structures on PCBs in orientations that take advantage of reduced effects of thermal expansion and contraction. Typically, PCB traces are straight lines route along an X- or Y-axis of the PCB and 45° lines connecting various components or input/output pads and vias in the PCB. In addition, large area metal structures, such as ground planes and antennas, can often have multiple connections, where expansion and contraction can lead to high stress in the metal traces associated with those connections.

Embodiments provide connecting traces from solder lands oriented, to the extent possible, near to perpendicular to a line to an expansion neutral point defined by the attachment points of the package being affixed to the PCB (e.g., an equilibrium point defined by the solder bumps on the semiconductor device package or a center of gravity of those solder bumps). Solder lands and their associated traces formed at a same radial distance from the neutral point move a same distance during PCB expansion and contraction with respect to the neutral point, which introduces less stress on solder joints and less fatigue on the metal traces. This can improve board and package reliability.

Figure 3:
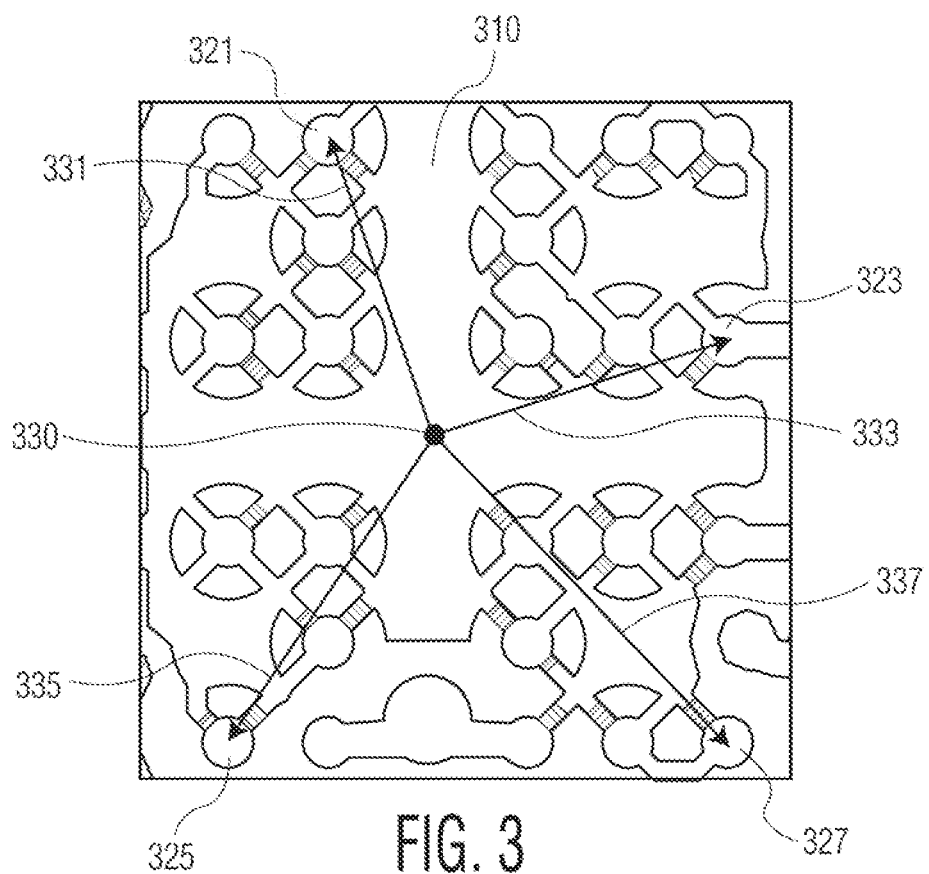
FIG. 3 is a simplified block diagram illustrating a plan view of a portion of a metal layer on a PCB in which a ground plane is formed.

FIG. 3 is a simplified block diagram illustrating a plan view of a portion of a metal layer on a PCB in which a ground plane is formed. Ground plane 310 is a region on the PCB in which a large area of the layer is unbroken metal. In addition, a plurality of solder lands (e.g., 321, 323, 325, and 327) are formed in the metal layer and are electrically coupled to ground plane 310 by traces. As a point of reference for the discussion below, an expansion neutral point 330 is illustrated near the center of the PCB region including the ground plane. Further illustrated are radial lines (e.g., 331, 333, 335, and 337) extending from neutral point 330 to solder lands 321, 323, 325, and 327. These radial lines indicate a stress propagation direction from the neutral point out to the edges of the region in which the semiconductor device package is attached.

It should be noted that the neutral point appears near the center of the illustrated region in FIG. 3 due to a relatively uniform distribution of solder lands (and corresponding solder bumps on the semiconductor device package). Should the distribution of solder lands be non-uniform, for example, with more solder bumps to one side than the other, then the neutral point may shift toward the region in which there are a greater density of solder lands (i.e., the center of gravity of the solder lands shifts and so too does the neutral point).

FIG. 3 illustrates results of a thermo-mechanical modeling simulation on the traces, showing traces placed under stress due to differences in contraction subsequent to heating between the PCB and a semiconductor device coupled to the solder lands. The simulation results suggest that the traces joining solder lands to the ground plane having the greatest stress are those oriented radially toward expansion neutral point 330. In addition, the radially oriented traces placed under greatest stress are those which are furthest from the neutral point. Conversely, traces that are oriented more perpendicular to a radial line from the expansion neutral point exhibit lower stresses.

The thermo-mechanical modeling illustrated in FIG. 3 suggest that formation of metal structures that are approximately perpendicular to radial lines leading from a center or neutral point on a PCB can lead to reduced stress in those metal structures as a result of differences in thermal contraction between a PCB and a semiconductor device coupled to the PCB. This can improve reliability of packages subject to significantly varying temperatures during formation and use.

Figure 4:
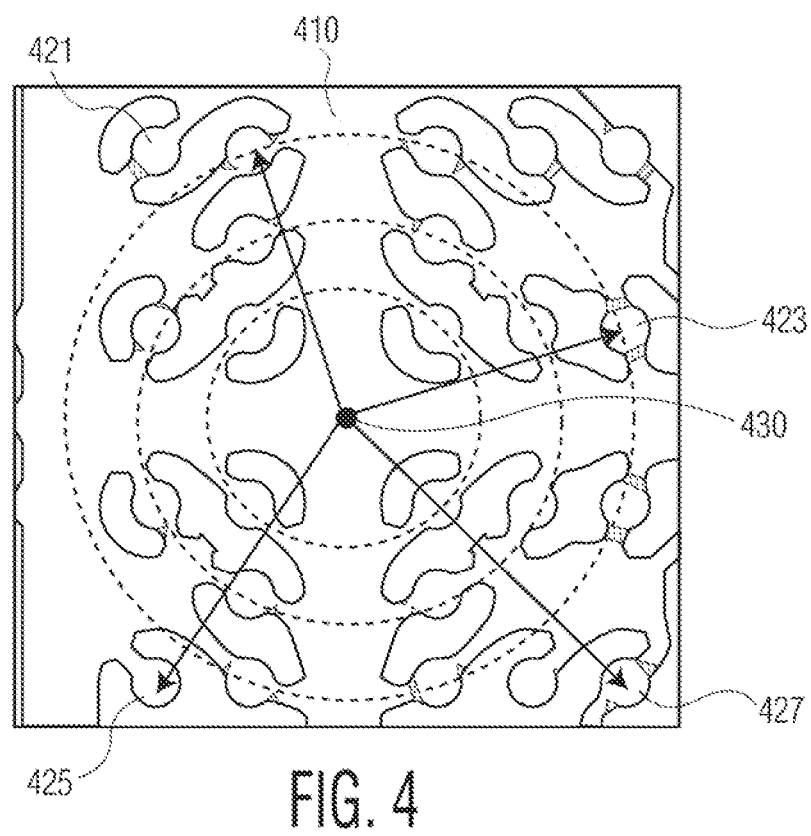
FIG. 4 is a simplified block diagram illustrating a plan view of a portion of a metal layer on a PCB in which a ground plane is formed utilizing the rule suggested above, in accord with embodiments of the present invention.

FIG. 4 is a simplified block diagram illustrating a plan view of a portion of a metal layer on a PCB in which a ground plane is formed utilizing the rule suggested above, in accord with embodiments of the present invention. Ground plane 410 is a region on the PCB in which a large area of the layer is unbroken metal. In addition, a plurality of solder lands (e.g., 421, 423, 425, and 427) are formed in the metal layer and are electrically coupled to ground plane 410 by traces. Unlike the structure in FIG. 3, long axes of the traces coupling the solder lands to the ground plane in FIG. 4 are shown to be formed approximately perpendicular to radial lines emanating from a neutral point 430 (e.g., along concentric circles surrounding the neutral point), while short axes of these traces are parallel to the stress direction.

FIG. 4 also illustrates results of a thermo-mechanical modeling simulation on the traces, to show which traces are placed under stress due to differences in contraction subsequent to heating between the PCB and a coupled semiconductor device to the solder lands. As suggested by the results of the modeling in FIG. 3, the traces formed with the long axis approximately perpendicular to the radial lines have significantly reduced stress as compared to radially-directed traces illustrated in FIG. 3, in light of the narrower profile of the short axis being exposed to the stress propagation direction.

Figure 5:
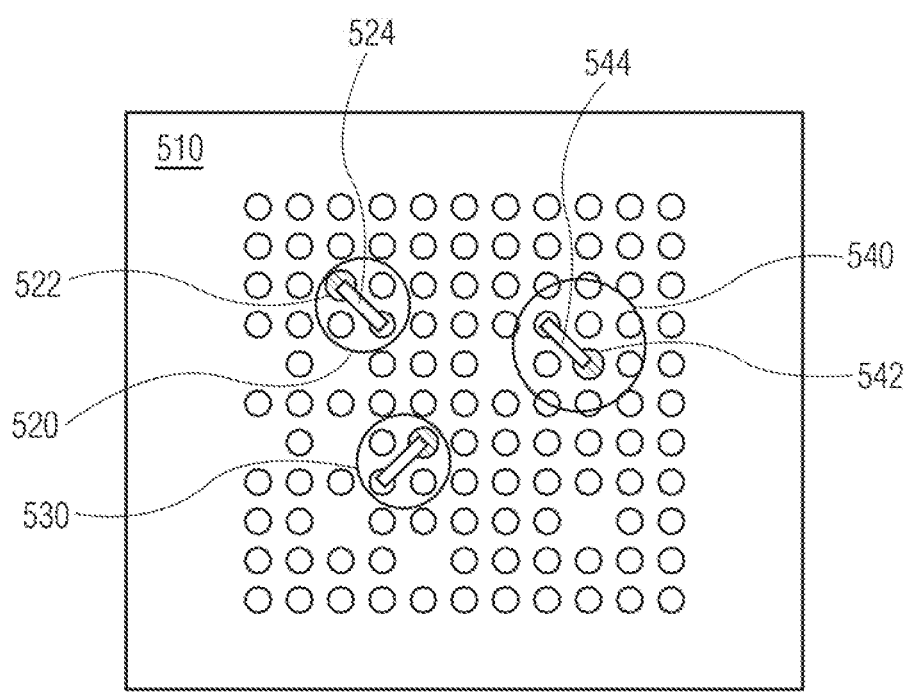
FIG. 5 is a simplified block diagram illustrating a plan view of a portion of a portion of a PCB having solder lands in a grid pattern.

FIG. 5 is a simplified block diagram illustrating a plan view of a portion of a portion of a PCB having solder lands in a grid pattern. FIG. 5 shows three traces coupling a solder land to a via (solid black circle): two traces (e.g., 524) are radial to a center point of the PCB (520 and 530) and one trace (e.g., 544) is perpendicular to a radial line to the center point (540). A via (e.g., 522 and 542) is a filled hole to a core of the PCB and is therefore more fixed in a point than the solder lands will be, especially for a soft PCB, as discussed above. The lands can be soldered to a semiconductor device that may have a significantly different CTE from the PCB, and therefore stresses can result on the lands during contraction after soldering the semiconductor device to the lands. In a softer PCB, the solder lands will shift due to the stresses, while the via points will experience less shifting, if any due to be fixed with respect to the core of the PCB. As with the discussion above related to the configuration of traces between solder lands and a ground plane, traces coupling solder lands to vias that run radially from the neutral point (e.g., 524) will experience greater stresses than the traces running approximately perpendicularly to the radial line to the neutral point (e.g., 544). Therefore, routing of traces to fixed points on the PCB should be preferentially routed along the perpendicular lines.

Figure 6:
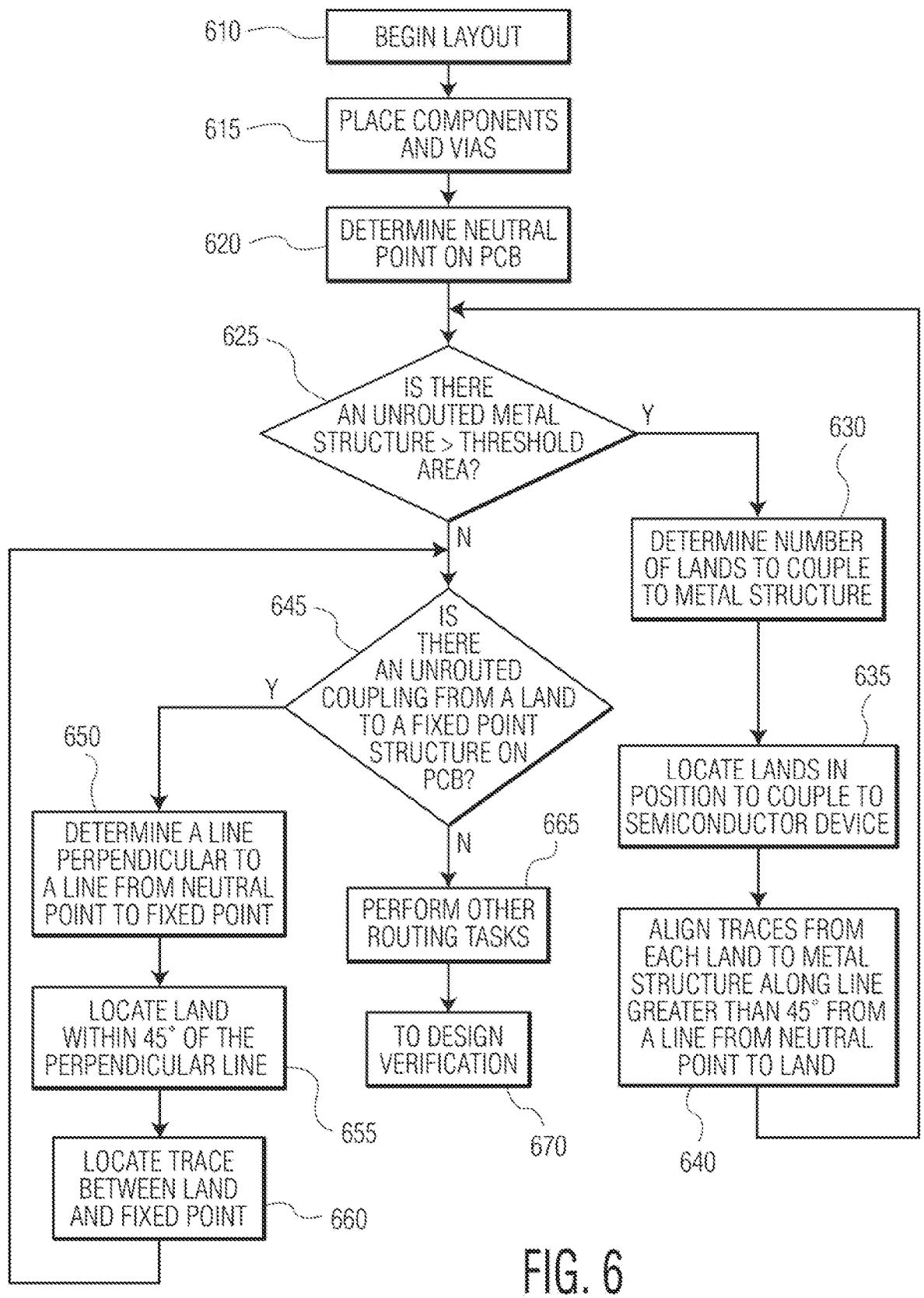
FIG. 6 is a simplified flow diagram illustrating an example of a trace routing process in accord with embodiments of the present invention.

FIG. 6 is a simplified flow diagram illustrating an example of a trace routing process in accord with embodiments of the present invention. In one example, an embodiment of the present invention can be implemented during the layout and routing stage of PCB design. Circuit function and schematics can be determined at earlier stages and then passed to the layout stage (610). Initially during the layout stage, components and vias can be placed for the PCB design (615). Once such placement has occurred and approximate dimensions of the PCB are determined, an expansion neutral point on the PCB can be located (620). In general, for a fully-populated array of solder bumps, such an expansion neutral point will be the center of the area of the semiconductor device package. The center point can be considered "fixed" as any expansion and contraction of the PCB can be considered to occur in relation to that fixed point.

Trace routing tasks can begin with a determination of whether there is an un-routed metal structure that has an area greater than a predetermined threshold area (625). As discussed above, such metal structures can be, for example, ground planes and package antenna structures formed in a metal layer of the PCB. The predetermined area threshold for metal structures can vary for different PCB materials (e.g., "hard" or "soft" materials) due to differences in coefficients of thermal expansion and how much a softer PCB material may permit solder lands coupled to the metal structure to shift as a result of expansion and contraction.

If there is an un-routed metal structure having greater than the threshold area, then a number of lands coupled to the metal structure is determined (630). The lands can then be located in positions appropriate for coupling to a semiconductor device (635). The routing system can align traces from each land to the metal structure along a line approximately perpendicular to a line from the neutral point to the land (640). Advantage of the reduced stress on the metal components can be realized if the traces are within a range of 45-90 degrees from the line to the expansion neutral point. Such land-to-metal structure traces are illustrated in FIG. 4 above. The process can then proceed to determine whether there are any other un-routed metal structures greater than the threshold area (625).

Once all metal structures of the threshold area present in the design have been routed, then a determination can be made as to whether there are any un-routed couplings from a land to a fixed-point structure on the PCB (645). As discussed above, such fixed-point structures can include, for example, vias that can root that point to a core of the PCB. If there are such structures, then a line perpendicular to a line from the neutral point to the fixed-point structure is determined (650). A land can then be located within 45 degrees of the perpendicular line, as appropriate for coupling to a semiconductor device or other external structure (655). A trace can then be located between the land and the fixed-point structure (660). The process can then proceed to determine whether there are any other un-routed fixed-point structures (645).

If there are no further fixed-point structures, then the layout and routing process proceeds with other routing tasks (665) and then the design is passed to a design verification stage (670).

By now it should be appreciated that there has been provided a method for routing a conductive trace on a PCB. That method includes locating an expansion neutral point on the PCB that is subject to expansion and contraction, determining a first line from the expansion neutral point to a first point on the PCB where the first point is an end point of a conductive trace, determining a second line perpendicular to the first line through the first point, locating a second point on the PCB at a point on the second line, and aligning the conductive trace from the first point to the second point along the second line where the second point is an end point of the conductive trace.

In one aspect of the above embodiment, the first point is a solder land on the PCB, and the second point is on a portion of a metal structure formed on the PCB having greater than a threshold surface area. In a further aspect, the solder land is one of a plurality of solder lands coupled to the metal structure. In still a further aspect, the method further includes, for each one of the plurality of solder lands, determining a line from the neutral point to one of the plurality of solder lands, determining a line perpendicular to the line from the neutral point through one of the plurality of solder lands, and aligning a conductive trace from the one of the plurality of solder lands to a portion of the metal structure along the perpendicular line. In yet another further aspect, the method further includes locating each of the plurality of solder lands for coupling to a corresponding interconnect pad of a semiconductor device, where the semiconductor device includes a different coefficient of thermal expansion than that of the PCB. In still a further aspect, the expansion neutral point is determined with respect to a configuration of the interconnect pads of the semiconductor device. In another further aspect, the expansion neutral point is located below the center of the semiconductor device when the semiconductor device is placed on the PCB.

In another aspect of the above embodiment, the metal structure is a ground plane. In another aspect, the first point is a via through the PCB and the second point is a solder land on the PCB. In a further aspect, the solder land is one of a plurality of solder lands configured for coupling to a semiconductor device, and the semiconductor device has a different coefficient of thermal expansion than that of the PCB.

Another embodiment of the present invention provides a semiconductor device package that includes: a PCB having a first coefficient of thermal expansion (CTE) and a plurality of interconnect pads; a semiconductor device having a second CTE that is different from the first CTE; a plurality of solder lands formed on the PCB where each solder land is coupled to a corresponding interconnect pad of the semiconductor device; and a metal structure formed on the PCB where one or more of the plurality of solder lands are coupled to the metal structure by a corresponding trace formed on the PCB. Each trace is formed on a line perpendicular to a line from the corresponding solder land to an expansion and contraction neutral point on the PCB.

In one aspect of the above embodiment, the expansion and contraction neutral point is determined with respect to a configuration of the interconnect pads of the semiconductor device. In a further aspect, the expansion and contraction neutral point is below the center of the semiconductor device package.

In another aspect of the above embodiment, the metal structure is one of a ground plane or an antenna. In yet another aspect of the above embodiment, the metal structure is AVF formed through the PCB. In still another aspect of the above embodiment, the metal structure is formed without a trace having a long axis aligned with a line from the metal structure to the expansion and contraction neutral point on the PCB.

Another embodiment of the present invention provides a method for reducing stress from manufacturing cooling on solder joints used to attach a semiconductor device to a PCB. The method includes determining an expansion neutral point on the semiconductor device where said determining is performed using a configuration of interconnect pads of the semiconductor device, locating a corresponding PCB expansion neutral point beneath the expansion neutral point on the semiconductor device, locating a solder land on the PCB where the solder land is configured to couple an interconnect pad of the semiconductor device to the PCB, determining a first line from the expansion neutral point to the solder land, and aligning a conductive trace from the solder land to a second point on the PCB at an angle between 45° to 90° from the first line where the second point is an end point of the conductive trace.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for routing a conductive trace on a printed circuit board (PCB), the method comprising:
   locating an expansion neutral point on a PCB subject to expansion and contraction;
   determining a first line from the expansion neutral point to a first point on the PCB, wherein the first point is an end point of the conductive trace;
   determining a second line perpendicular to the first line through the first point;
   locating a second point on the PCB at a point on the second line; and aligning the conductive trace from the first point to the second point along the second line, wherein the second point is an end point of the conductive trace.

2. The method of claim 1, wherein
the first point is a solder land on the PCB; and
the second point is on a portion of a metal structure formed on the PCB having greater than a threshold surface area.

3. The method of claim 2 wherein the solder land is one of a plurality of solder lands coupled to the metal structure.

4. The method of claim 3 further comprising for each one of the plurality of solder lands:
determining a line from the neutral point to the one of the plurality of solder lands;
determining a line perpendicular to the line from the neutral point through the one of the plurality of solder lands;
aligning a conductive trace from the one of the plurality of solder lands to a portion of the metal structure along the perpendicular line.

5. The method of claim 3 further comprising:
locating each of the plurality of solder lands for coupling to a corresponding interconnect pad of a semiconductor device, wherein
the semiconductor device comprises a different coefficient of thermal expansion than that of the PCB.

6. The method of claim 5 wherein the expansion neutral point is determined with respect to a configuration of the interconnect pads of the semiconductor device.

7. The method of claim 5 wherein the expansion neutral point is located below the center of the semiconductor device when the semiconductor device is placed on the PCB.

8. The method of claim 2 wherein a ground plane comprises the metal structure.

9. The method of claim 1, wherein
the first point is a via through the PCB; and
the second point is a solder land on the PCB.

10. The method of claim 9, wherein
the solder land is one of a plurality of solder lands configured for coupling to a semiconductor device; and
the semiconductor device comprises a different coefficient of thermal expansion than that of the PCB.

11. A semiconductor device package comprising:
a printed circuit board (PCB) comprising a first coefficient of thermal expansion (CTE) and a plurality of interconnect pads;
a semiconductor device comprising a second CTE that is different from the first CTE;
a plurality of solder lands formed on the PCB, wherein each solder land is coupled to a corresponding interconnect pad of the semiconductor device;
a metal structure formed on the PCB wherein one or more of the plurality of solder lands are coupled to the metal structure by a corresponding trace formed on the PCB, wherein
each trace is formed on a line perpendicular to a line from the corresponding solder land to an expansion and contraction neutral point on the PCB.

12. The semiconductor device package of claim 11 wherein the expansion and contraction neutral point is determined with respect to a configuration of the interconnect pads of the semiconductor device.

13. The semiconductor device package of claim 12 wherein the expansion and contraction neutral point is below the center of the semiconductor device package.

14. The semiconductor device package of claim 11 wherein the metal structure is one of a ground plane or an antenna.

15. The semiconductor device package of claim 11 wherein the metal structure is a via formed through the PCB.

16. The semiconductor device package of claim 11 wherein the metal structure is formed without a trace having a long axis aligned with a line from the metal structure to the expansion and contraction neutral point on the PCB.

17. A method for reducing stress from manufacturing cooling on solder joints used to attach a semiconductor device to a printed circuit board (PCB), the method comprising:
determining an expansion neutral point on the semiconductor device, wherein said determining is performed using a configuration of interconnect pads of the semiconductor device;
locating a corresponding PCB expansion neutral point beneath the expansion neutral point on the semiconductor device;
locating a solder land on the PCB, wherein the solder land is configured to couple an interconnect pad of the semiconductor device to the PCB;
determining a first line from the expansion neutral point to the solder land;
aligning a long axis of a conductive trace from the solder land to a second point on the PCB at an angle between 45 degrees to 90 degrees from the first line, wherein the second point is an end point of the conductive trace.

* * * * *